United States Patent
Priess et al.

(10) Patent No.: US 10,696,116 B2
(45) Date of Patent: Jun. 30, 2020

(54) AIR SPRING CONNECTING DEVICE SEAL

(71) Applicants: THYSSENKRUPP BILSTEIN GMBH, Ennepetal (DE); thyssenkrupp AG, Essen (DE)

(72) Inventors: Jens Priess, Oberhausen (DE); Matthias Becker, Fröndenberg (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/062,729

(22) PCT Filed: Dec. 9, 2016

(86) PCT No.: PCT/EP2016/080442
§ 371 (c)(1),
(2) Date: Jun. 15, 2018

(87) PCT Pub. No.: WO2017/102584
PCT Pub. Date: Jun. 22, 2017

(65) Prior Publication Data
US 2018/0370316 A1   Dec. 27, 2018

(30) Foreign Application Priority Data
Dec. 18, 2015   (DE) .................. 10 2015 226 044

(51) Int. Cl.
*B60G 11/28*   (2006.01)
*F16F 9/04*   (2006.01)
(Continued)

(52) U.S. Cl.
CPC .............. *B60G 11/28* (2013.01); *B60G 11/27* (2013.01); *F16F 9/0454* (2013.01); *F16F 9/54* (2013.01);
(Continued)

(58) Field of Classification Search
CPC .............. B60G 11/28; B60G 2204/126; B60G 2206/82092; B60G 11/27; F16F 9/54;
(Continued)

(56) References Cited

U.S. PATENT DOCUMENTS

| | | | |
|---|---|---|---|
| 4,768,758 A | | 9/1988 | Buma |
| 5,009,401 A | * | 4/1991 | Weitzenhof ............ B60G 15/14 188/321.11 |

(Continued)

FOREIGN PATENT DOCUMENTS

| | | |
|---|---|---|
| CN | 1675080 A | 9/2005 |
| CN | 101235859 A | 8/2008 |

(Continued)

OTHER PUBLICATIONS

English Translation of International Search Report issued in PCT/EP2016/080442, dated Mar. 9, 2017 (dated Mar. 17, 2017).

*Primary Examiner* — Pamela Rodriguez
(74) *Attorney, Agent, or Firm* — thyssenkrupp North America, LLC

(57) ABSTRACT

An air spring connecting device for mounting an air spring strut on a vehicle may include an air spring support bearing having a head bearing receiver, a head bearing having at least one cylindrical outer surface, and a piston rod that is axially guided through the head bearing and is sealed in an airtight manner relative to the head bearing. The head bearing may be positioned in the head bearing receiver of the (Continued)

air spring support bearing positioned coaxially relative to the piston rod. An airtight connection may be formed between the head bearing receiver and the head bearing. A press connection element may be positioned in direct contact with the head bearing receiver and the head bearing. A sealing element may be positioned in a region of the head bearing receiver between the air spring support bearing and the head bearing.

8 Claims, 2 Drawing Sheets

(51) Int. Cl.
*B60G 11/27* (2006.01)
*F16F 9/54* (2006.01)
(52) U.S. Cl.
CPC .......... *B60G 2204/126* (2013.01); *B60G 2206/82092* (2013.01); *F16F 2226/045* (2013.01); *F16F 2230/30* (2013.01); *F16F 2230/32* (2013.01)
(58) Field of Classification Search
CPC ............. F16F 2230/30; F16F 2226/045; F16F 9/0454; F16F 2230/32

USPC ............ 267/220, 64.11, 64.15, 64.19, 64.21, 267/64.23, 64.24, 64.27; 188/322.16, 188/322.17, 321.11; 280/124.147, 280/124.155
See application file for complete search history.

(56) References Cited

U.S. PATENT DOCUMENTS

| | | | | |
|---|---|---|---|---|
| 7,284,644 | B2 * | 10/2007 | Cmich .................. | B60G 11/28 188/321.11 |
| 2011/0140323 | A1 * | 6/2011 | Kwon .................... | B60G 15/12 267/64.24 |

FOREIGN PATENT DOCUMENTS

| | | |
|---|---|---|
| CN | 202108917 U | 1/2012 |
| DE | 3509943 A | 1/1986 |
| DE | 102012012902 A | 1/2013 |
| DE | 102012210388 A | 1/2013 |
| DE | 102014100166 A | 7/2015 |
| DE | 102015005606 A | 11/2015 |
| EP | 1402195 A | 3/2004 |
| EP | 1475255 A | 11/2004 |
| WO | 03004902 A | 1/2003 |

* cited by examiner

AIR SPRING CONNECTING DEVICE SEAL

CROSS REFERENCE TO RELATED APPLICATIONS

This application is a U.S. National Stage Entry of International Patent Application Serial Number PCT/EP2016/080442, filed Dec. 9, 2016, which claims priority to German Patent Application No. DE 10 2015 226 044.5, filed Dec. 18, 2015, the entire contents of both of which are incorporated herein by reference.

FIELD

The present disclosure generally relates to spring struts for vehicles, including air spring connecting devices for mounting air spring struts on vehicles and methods for producing such air spring connecting devices.

BACKGROUND

Air springs are known in the prior art in a wide variety of embodiments. Air springs used for air suspension are based on a suspension system which utilizes the compressibility of gases, in particular of atmospheric air, and is also known as volume suspension. In volume suspension the spring action is based on volumes and thus on the change in pressure of the spring medium, such as for example air in the case of air suspension. The spring medium is enclosed by a receptacle, in particular a spring bellows, wherein the gas is compressed by externally acting dynamic forces, such as for example a deflection of a wheel, resulting in a change of volume. Thus the air suspension, in particular, is implemented by means of air bellows in which in the case of fluctuating pressure compressed air forms the counter-force to the dynamic forces on the respective wheel or axle. Moreover, by means of air suspension, the vehicle height may also be adjusted in a variable manner and, for example, the pressure in the springs may also be regulated by means of level regulating valves, such that the vehicle height remains constant irrespective of the load. In the case of a lack of air, the vehicle body is lowered onto mechanical emergency springs integrated therein. The replacement of air springs requires a large amount of material and is time-consuming. Additionally, the adjustment of the spring characteristic, such as for example the spring rate of conventional air springs, is only able to be altered in a very complex manner and/or retrospectively in a very time-intensive and cost-intensive manner. So that the air suspension is not negatively influenced by the compressed air losses and the air volume is constantly available in the air spring, a secure and permanently airtight seal of individual air spring components is necessary. This is problematical, in particular, in the connecting components of the air springs. To this end, for example, air spring components which are operatively connected by means of air technology are bonded together, in particular vulcanized or sealed by membranes. Thus individual components of an air spring may only be replaced in a very cost-intensive and very time-consuming manner.

An air spring arrangement having an air spring bellows and a shock absorber is disclosed in EP 1 402 195 A1.

Thus a need exists for improved air spring connecting devices for mounting air spring struts on vehicles and improved methods for producing such air spring connecting devices in which the aforementioned drawbacks are avoided. Moreover, a simple, more rapid and reliable attachment of air spring struts to vehicles is needed from such air spring connecting devices. Additionally, methods for producing such devices are needed that offer a stable production process that is less susceptible to damage, and that is simplified and more versatile.

DETAILED DESCRIPTION

Figure 1:
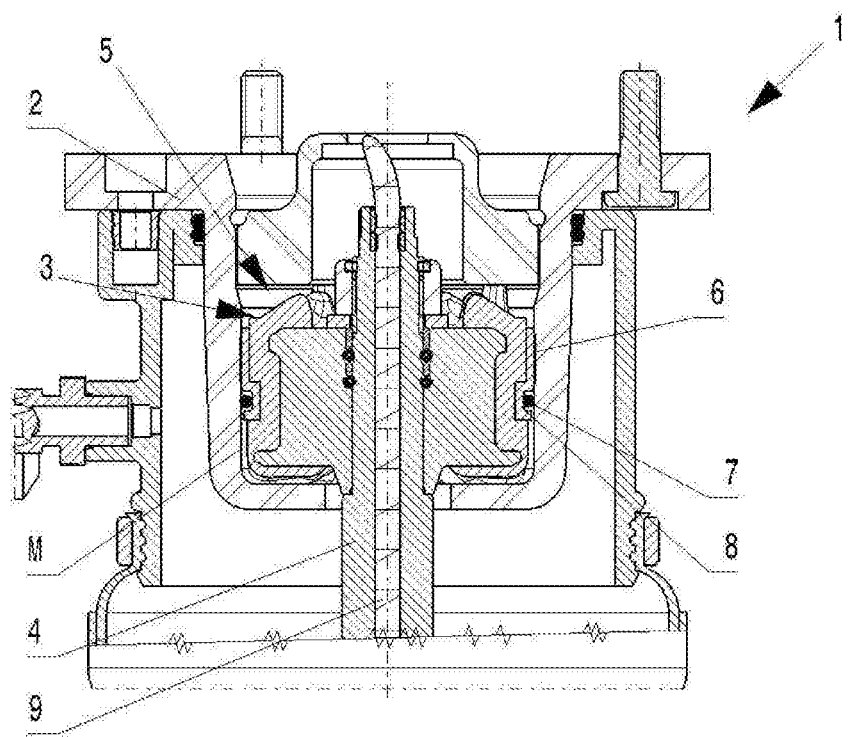
FIG. 1 is a schematic longitudinal sectional view of an example air spring connecting device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The air spring connecting device according to the invention has the advantage relative to conventional air spring connecting devices that a head bearing is releasably connected to an air spring support bearing, and thereby it is possible to combine different head bearings in a rapid manner with different air spring support bearings. As a result, it is possible to provide many potential variants in a rapid manner. Additionally, a flexible modular system may be produced and countless variants of air springs may be provided with a plurality of possible combinations using one or more head bearing(s) with the air spring support bearing(s). Moreover, a modular replacement of individual components of the air spring connecting device is possible in a rapid and simple manner. Additionally, individual components, such as for example the head bearing or air spring support bearing, may be standardized. A further advantage is the integration of the sealing plane into the head bearing, wherein it is also possible to provide a seal with a small number of sealing elements, in particular one sealing element.

The method according to the invention for producing an air spring connecting device has the advantage relative to conventional methods that the potential for combining head bearings with air spring support bearings and the potential for standardizing the individual modules is possible in a rapid manner and in that the method in comparison with the prior art is designed to be more variable, more flexible and optionally more uniform and simply possible. Thus a modular system with a plurality of possible combinations and variations is able to be disclosed by the method according to the invention. A further advantage is that the sealing plane is integrated in the head bearing, wherein it is also possible to provide a seal with a small number of sealing elements, in particular one sealing element.

The subject of the invention, therefore, is an air spring connecting device for mounting an air spring strut on a vehicle, comprising an air spring support bearing having a head bearing receiver, a head bearing having at least one cylindrical outer surface, a piston rod, wherein the piston rod is axially guided through the head bearing and is sealed in an airtight manner relative to the head bearing, wherein the head bearing is arranged in a head bearing receiver of the air spring support bearing arranged coaxially relative to the piston rod and an airtight connection is formed between the head bearing receiver of the air spring support bearing and the head bearing, wherein at least one press connection element is arranged in direct contact with the head bearing receiver of the air spring support bearing and the head bearing, and at least one sealing element is arranged, in the region of the head bearing receiver between the air spring support bearing and the head bearing.

A further subject of the invention is a method for producing an air spring connecting device for mounting an air spring strut on a vehicle, comprising the following steps:

a) providing an air spring support bearing having a head bearing receiver;

b) providing a head bearing comprising a piston rod which is axially guided through the head bearing and sealed in an airtight manner relative to the head bearing, wherein the head bearing comprises at least one cylindrical outer surface;

c) connecting the head bearing provided in step b) with the air spring support bearing provided in step a), wherein the head bearing is introduced into the head bearing receiver of the air spring support bearing and is sealed in an airtight manner relative to the air spring support bearing, wherein in a further step d) at least one press connection element is provided and in a further step e) at least one sealing element is provided and the connection is carried out in step c) by the at least one press connection element provided in step d) and is sealed in an airtight manner by the at least one sealing element provided in step e).

A further subject of the invention is the use of an air spring connecting device for mounting an air spring strut on a vehicle, in particular as a vibration damper, level regulator or combination thereof, comprising an air spring support bearing having a head bearing receiver, a head bearing having at least one cylindrical outer surface, a piston rod, wherein the piston rod is axially guided through the head bearing and is sealed in an airtight manner relative to the head bearing, wherein the head bearing is arranged in a head bearing receiver of the air spring support bearing arranged coaxially relative to the piston rod, and an airtight connection is formed between the head bearing receiver of the air spring support bearing and the head bearing, wherein at least one press connection element is arranged in direct contact with the head bearing receiver of the air spring support bearing and the head bearing and at least one sealing element is arranged in the region of the head bearing receiver between the air spring support bearing and the head bearing.

"Air spring connecting device" within the scope of the present invention is understood as a device which at least operatively connects an air spring strut to the load to be absorbed, in particular a vehicle body or an axle of the vehicle.

"Air spring strut" within the scope of the present invention is understood as a system for damping mechanical vibrations such as for example vibrations, jolts, impacts and combinations thereof. In particular, with vibration dampers subjected to mechanical vibration, kinetic energy, in particular vibration energy, is converted into thermal energy. In the field of vehicle technology, vibration dampers in particular are used in chassis of motor vehicles and are generally denoted as (vehicle) shock absorbers. These (vehicle) shock absorbers operate independently of the frequency and require a "quiet" counterpart, such as for example a body and, in particular, are also denoted as friction brakes. For example, an air spring strut comprises a system consisting of a shock absorber element and an air spring element. The mode of operation of air spring elements is based on a suspension system which utilizes the compressibility of gases, in particular of atmospheric air, and is also denoted as volume suspension. In volume suspension the spring action is based on volumes and thus on the change of pressure of the spring medium, such as for example air in the case of air suspension. The spring medium is enclosed by a receptacle, in particular a spring bellows, wherein the gas is compressed by externally acting dynamic forces, such as for example the deflection of a wheel, resulting in a change of volume. Thus the air suspension, in particular, is implemented by means of air bellows, in which in the case of fluctuating pressure, the compressed air forms the counter-force to the dynamic forces on the respective wheel or axle.

"Air spring support bearing" is understood within the scope of the present invention as a support bearing which is able to be operatively connected to the load to be absorbed, in particular of a vehicle body or an axle of the vehicle, and may receive a head bearing.

"Head bearing" is understood within the scope of the present invention as a bearing arranged on the top side relative to a shock absorber element and/or an air spring element. For example, a piston rod may be received by a head bearing, in particular the piston rod may be fixedly arranged in the head bearing.

"Sealed in an airtight manner" within the scope of the present invention is understood to mean making something impermeable to air. In particular "sealed in an airtight manner" is understood as airtight insulation of a region containing compressed air, such as for example a receptacle of the air spring connecting device relative to the surrounding air. For example, an air spring interior is sealed relative to the surrounding air.

"Press connection element" is understood within the scope of the present invention as an element for producing interference fits. In particular, an at least non-positive joint may be produced by a press connection element which is paired with a counterpart. For example, an interference fit is a connection of two parts which utilizes the friction between these two parts. In this case, for example, the thermal expansion of the materials of these parts may be utilized. Most materials expand when they are heated. Thus two parts which have been cooled and assembled may be fixedly joined together after coming to room temperature, since they have been fixedly wedged together by the expansion. Examples of press connection elements are selected from a group of press rings, press sleeves or combinations thereof.

"Sealing element" within the scope of the present invention is understood as an element which produces an at least airtight connection between the air spring support bearing, in particular the head bearing receiver and the head bearing, and in particular is selected from static seals known from the prior art, the sealing elements thereof not being subjected to any relative movements, such as for example a seal of a rotating shaft relative to a static housing. According to the invention, seals are selected, for example, from the group consisting of flat seals, profile seals, sleeve seals, sealing compounds, sealing rings, in particular O-rings, rubber sealing rings, natural rubber sealing rings, polymer sealing rings and combinations thereof.

In a further embodiment of the invention, the at least one press connection element and/or the at least one sealing element is/are arranged in the region of the cylindrical outer surface of the head bearing receiver of the air spring connecting device.

In a preferred embodiment of the invention, the at least one press connection element comprises at least one sealing element receiver, in particular a sealing element recess and the at least one sealing element is arranged on the at least one sealing element receiver.

According to a further embodiment of the invention, the at least one sealing element is not arranged in direct contact with the head bearing. For example, the at least one sealing element is in direct contact with the at least one press connection element, wherein the press connection element is in direct contact with the head bearing receiver of the air spring support bearing.

According to a further embodiment of the invention, the at least one sealing element forms a substance-to-substance bond with the head bearing and is/are configured as one or more sealing lip(s) of the head bearing.

In a further embodiment of the invention, the at least one sealing element is arranged on the side of the press connection element facing the air spring, in the coaxial direction relative to the piston rod.

In a preferred embodiment of the invention, the press connection element is configured as a press fit with an excess of more than 0.05 mm, preferably more than 0.1 mm, particularly preferably more than 0.15 mm, quite particularly preferably more than 0.2 mm.

According to a preferred embodiment of the invention, the airtight connection which is configured in at least one region between the head bearing receiver and the head bearing is a releasable connection. Examples of a releasable connection are non-substance-to-substance bonds. In particular, these connections may be clamped connections and/or plug connections.

According to a preferred embodiment of the invention, the piston rod is configured as a piston rod tube. In particular, access is possible to an internal region of a vibration damper.

In a further preferred embodiment of the invention, the piston rod tube comprises a cable duct. For example, a cable may be arranged/is arranged inside the cable duct for adjusting the electrical damping force of a vibration damper.

According to a further embodiment of the invention, the at least one press connection element provided in step d) and/or the at least one sealing element provided in step e) is/are arranged in the region of the cylindrical outer surface of the head bearing receiver of the air spring support bearing.

In a further embodiment of the invention, the at least one press connection element provided in step d) comprises at least one sealing element receiver, in particular a sealing element recess, and the at least one sealing element provided in step e) is arranged on the at least one sealing element receiver. In particular, the sealing element recess may be configured as a groove, in particular an annular groove.

According to a further embodiment of the invention, the at least one sealing element provided in step e) is not arranged in direct contact with the head bearing. For example, the at least one sealing element is arranged in direct contact with the at least one press connection element, wherein the press connection element is in direct contact with the head bearing receiver of the air spring support bearing.

According to a further embodiment of the invention, the at least one sealing element provided in step e) is/are formed as a substance-to-substance bond with the head bearing and is/are configured as one or more sealing lip(s) of the head bearing. In particular, the at least one sealing element is configured integrally with the head bearing.

In a further embodiment of the invention, the at least one sealing element provided in step e) is arranged on the side of the press connection element facing the air spring, in the coaxial direction relative to the piston rod.

According to a preferred embodiment of the invention, the press connection element provided in step d) is configured as a press fit with an excess of more than 0.05 mm, preferably more than 0.1 mm, particularly preferably more than 0.15 mm, quite particularly preferably more than 0.2 mm.

In a further embodiment of the invention, the connection in step c) is configured at least in a region between the head bearing receiver and the head bearing and is implemented as a releasable connection. Examples of a releasable connection are non-substance-to-substance bonds. In particular, these connections may be clamped connections and/or plug connections.

In a preferred embodiment of the invention, the piston rod of the head bearing provided in step b) is configured as a piston rod tube. In particular, access is possible to an internal region of a vibration damper.

According to a further preferred embodiment of the invention, the piston rod of the head bearing provided in step b) is configured as a piston rod tube, wherein the piston rod tube is provided with a cable duct.

In FIG. 1 is shown a longitudinal section of an air spring connecting device 1, comprising an air spring support bearing 2 for connecting to a load to be absorbed, in particular a vehicle body or an axle of the vehicle, a head bearing 3 and a piston rod 4 according to an embodiment of the invention. The air spring support bearing 2 comprises a head bearing receiver 5, the head bearing 3 being arranged therein. The head bearing receiver 5 is shown with an outer surface M. The piston rod 4 is passed axially through the head bearing 3 and sealed by sealing elements in an airtight manner relative to the head bearing 3. A press connection element 6 is arranged between the air spring support bearing 2 and the head bearing 3. The press connection element 6 forms a press fit between the air spring support bearing 2 and the head bearing 3. On the side remote from the load to be absorbed, in particular of a vehicle body or an axle of the vehicle, a sealing element 7 is arranged coaxially relative to the piston rod 4. The press connection element 6 comprises a sealing element receiver 8, the sealing element 7 being arranged therein. The sealing element 7 seals the head bearing 3 relative to the air spring support bearing 2 in an airtight manner. The piston rod 4 is designed as a piston rod tube with a cable duct 9. A cable, in particular for adjusting the electrical damping force, is guided through the cable duct 9.

Figure 2:
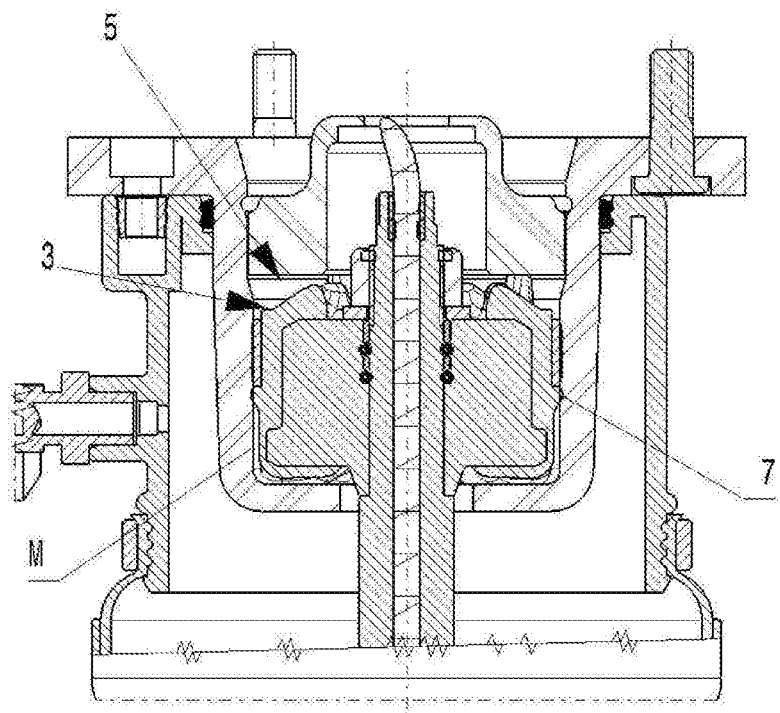
FIG. 2 is a schematic longitudinal sectional view of an example air spring connecting device according to FIG. 1 with a sealing lip configured on a head bearing.

A longitudinal section of the air spring connecting device 1 according to FIG. 1 having the sealing element 7 with the contour of a sealing lip is shown in FIG. 2. The sealing lip is shown arranged on the head bearing 3. The sealing element 7 is in direct contact with the outer surface M of the head bearing receiver 5 with the sealing lip, wherein the sealing element 7 seals the head bearing 3 in an airtight manner relative to the air spring support bearing 2.

Figure 3:
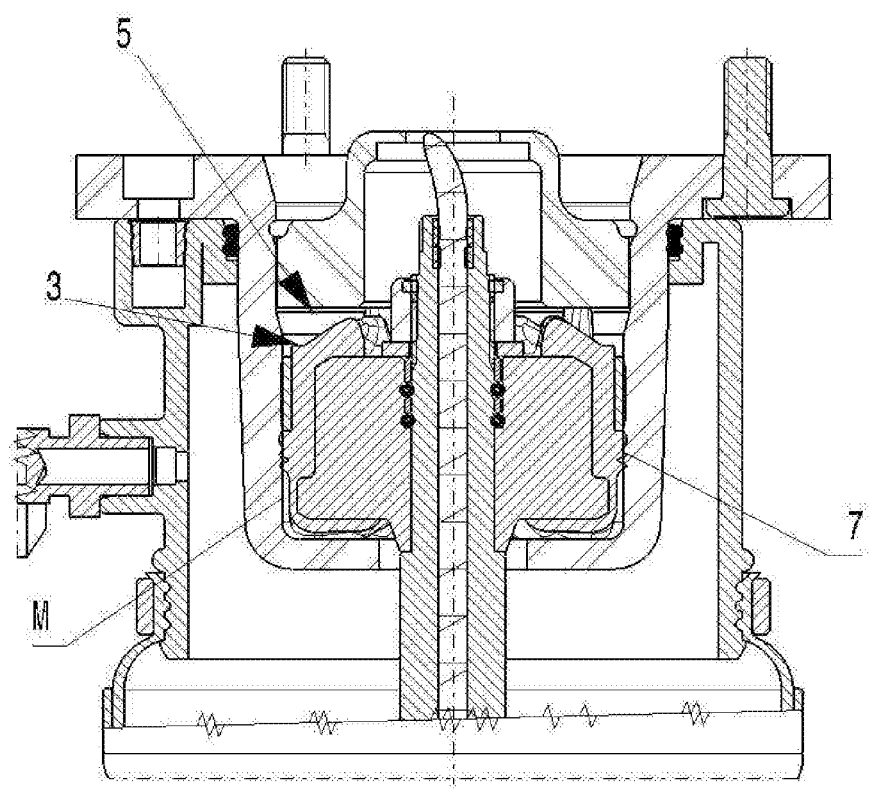
FIG. 3 is a schematic longitudinal sectional view of an example air spring connecting device according to FIG. 2 with two sealing lips configured on a head bearing.

In FIG. 3, a longitudinal section of the air spring connecting device 1 according to FIG. 2 is shown. The sealing element 7 arranged on the head bearing 3 is shown with the contour of two sealing lips. The sealing element 7 is in direct contact with the outer surface M of the head bearing receiver 5 with the two sealing lips, wherein the sealing element 7 seals the head bearing 3 in an airtight manner relative to the air spring support bearing 2.

Air spring connecting devices for mounting an air spring strut on a vehicle and a method for producing an air spring connecting device for mounting an air spring strut on a vehicle of the type described above are used in the production of vehicles, in particular chassis of motor vehicles.

LIST OF REFERENCE NUMERALS

1=Air spring connecting device
2=Air spring support bearing
3=Head bearing
4=Piston rod
5=Head bearing receiver
6=Press connection element(s)
7=Sealing element(s)
8=Sealing element receiver(s)
M=Outer surface

What is claimed is:

1. An air spring connecting device for mounting an air spring strut on a vehicle, the air spring connecting device comprising:
   an air spring support bearing having a head bearing receiver;
   a head bearing having a cylindrical outer surface;
   a piston rod that is axially guided through the head bearing and is sealed in an airtight manner relative to the head bearing, wherein the head bearing is positioned in the head bearing receiver of the air spring support bearing positioned coaxially relative to the piston rod, wherein an airtight connection exists between the head bearing receiver of the air spring support bearing and the head bearing;
   a press connection element disposed in direct contact with the head bearing receiver of the air spring support bearing and the head bearing; and
   a sealing element disposed in a region of the head bearing receiver between the air spring support bearing and the head bearing, which sealing element forms a substance-to-substance bond with the head bearing and is configured as a sealing lip of the head bearing.

2. The air spring connecting device of claim 1 wherein at least one of the press connection element or the sealing element is disposed in a region of the cylindrical outer surface.

3. The air spring connecting device of claim 1 wherein the press connection element comprises a sealing element receiver, wherein the sealing element is disposed on the sealing element receiver.

4. The air spring connecting device of claim 3 wherein the sealing element receiver comprises a recess.

5. The air spring connecting device of claim 1 wherein the sealing element is spaced apart from the head bearing.

6. A method for producing an air spring connecting device for mounting an air spring strut on a vehicle, the method comprising:
   providing an air spring support bearing having a head bearing receiver;
   providing a head bearing comprising a piston rod that is axially guided through the head bearing and sealed in an airtight manner relative to the head bearing, wherein the head bearing comprises a cylindrical outer surface and a sealing lip;
   providing a press connection element;
   providing a sealing element having a substance-to-substance bond with the head bearing; and
   connecting the head bearing with the air spring support bearing by way of the press connection element, wherein the head bearing is introduced into the head bearing receiver of the air spring support bearing and is sealed by way of the sealing element in an airtight manner relative to the air spring support bearing.

7. The method of claim 6 comprising positioning at least one of the press connection element or the sealing element in a region of the cylindrical outer surface.

8. The method of claim 6 wherein the press connection element comprises a sealing element receiver, wherein the sealing element is disposed on the sealing element receiver.

* * * * *